No. 830,939. PATENTED SEPT. 11, 1906.
W. H. THOMPSON.
CULTIVATOR.
APPLICATION FILED APR. 17, 1906.
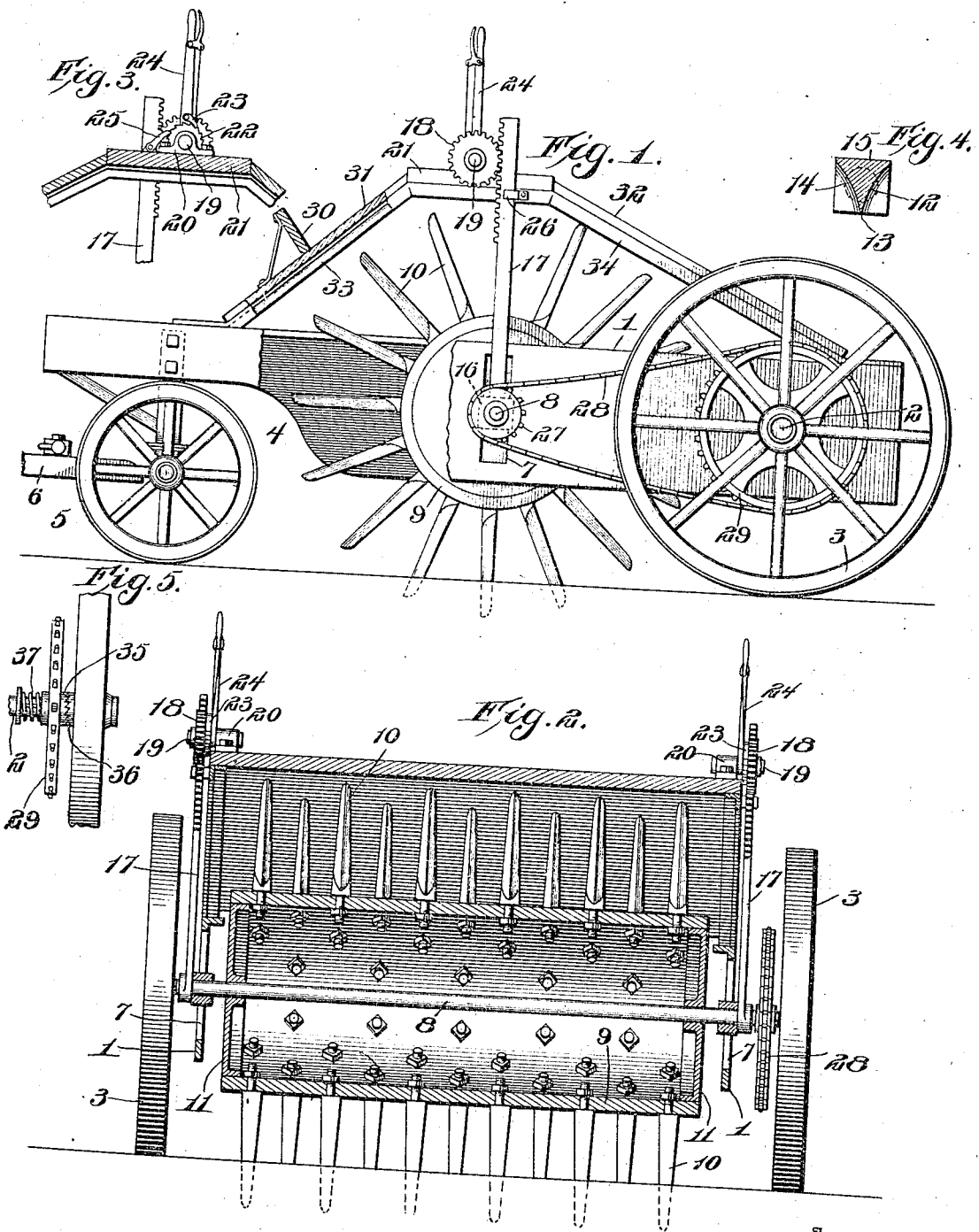
Witnesses
Louis R. Heinrichs.
P. M. Smith
Inventor
William H. Thompson
By Victor J. Evans
Attorney

UNITED STATES PATENT OFFICE.

WILLIAM H. THOMPSON, OF CORNING, IOWA.

CULTIVATOR.

No. 830,939.

Specification of Letters Patent.

Patented Sept. 11, 1906.

Application filed April 17, 1906. Serial No. 312,190.

*To all whom it may concern:*

Be it known that I, WILLIAM H. THOMPSON, a citizen of the United States, residing at Corning, in the county of Adams and State of Iowa, have invented new and useful Improvements in Cultivators, of which the following is a specification.

This invention relates to cultivators, the object of the invention being to provide a rotary cultivator or, in other words, a cultivator embodying a rotary disk which carries combined cutting and cultivating teeth, which in the operation of the cultivator as a whole act to cut weeds, stalks, and the like and also to cultivate and pulverize the soil, leaving the earth in splendid condition for planting seed and for receiving moisture, thus doing away with the necessity of subsequently running a harrow or plow over the ground previously acted upon by the cultivator.

A further object of the invention is to provide means for adjusting the depth of penetration of the cutting and cultivating teeth. With the above and other objects in view, the nature of which will more fully appear as the description proceeds, the invention consists in the novel construction, combination, and arrangement of parts hereinafter more fully described, illustrated, and claimed.

In the accompanying drawings, Figure 1 is a sectional side elevation of a cultivator embodying the present invention. Fig. 2 is a cross-section through the same, taken in line with the shaft of the cylinder. Fig. 3 is a detail side elevation showing a portion of the cylinder-adjusting mechanism. Fig. 4 is a cross-sectional view of one of the cutting and cultivating teeth. Fig. 5 is a detail view showing the clutched engagement between the main driving-sprocket and the main driving-shaft of the machine.

The machine in its general organization comprises, essentially, the oppositely-arranged side frame-bars 1, connected together and braced in any suitable manner to form the main frame of the machine, the rear end of said frame being supported upon the axle 2, which carries the main drive-wheels 3, while the forward end of the frame is recessed underneath, as shown at 4, and mounted upon a front truck 5, the wheels of which are adapted to turn under the body of the frame, so as to allow the machine as a whole to turn on a short curve. 6 designates the draft-pole or tongue connected to the forward truck.

In carrying out the present invention the side frame bars 1 are provided with oppositely-arranged vertical slots 7, in which is movable up and down the shaft 8 of a cylinder 9, provided with a multiplicity of cutting and cultivating teeth 10, extending radially outward therefrom, as clearly shown in Figs. 1 and 2. The cylinder 9 is hollow, as shown in Fig. 2, and provided at its opposite ends with the heads or closures 11 to exclude dirt and provide for suitably mounting the cylinder fast on the shaft 8. Each of the teeth 10 is substantially triangular in cross-section, as shown in Fig. 4, or, in other words, comprises the forward cutting edge 13 for severing weeds and the like and the rearwardly-diverging and concave side walls 12 and 14, which terminate in a broad base or back 15, which operates to lift, disintegrate, and pulverize the soil after the same has been divided by the cutting edge 13. This leaves the soil in splendid condition to receive the seeds and moisture and to permit the sprouting of the seeds without packing the earth over the same.

The shaft 8 is mounted in sliding boxes 16, movable up and down in the slots 7 by means of rack-bars 17, extending upward at opposite sides of the frame, as shown in Figs. 1 and 2, and meshing with gear-wheels 18, mounted fast on a common shaft 19, journaled in bearings 20 on a superimposed seat 21 for the driver. The shaft 19 is also provided with a ratchet-wheel 22, with which a pawl 23 engages, said pawl being carried by a thumb-latch lever 24, provided for adjusting the cylinder up and down by means of the connections just described.

25 designates a detent which engages the ratchet-wheel 22 to hold the cylinder at any desired elevation after the same has been adjusted. The rack-bars 17 are steadied by suitable guides 26 on the machine-frame. The cylinder is driven by providing the shaft 8 thereof with sprocket-wheels 27 and passing a sprocket-chain 28 from said wheels around driving sprocket-wheels 29, fast on the axle 2. The wheels 3 constitute traction-wheels which drive the cylinder in the manner readily understood.

30 designates a foot-rest for the driver, and 31 and 32 designate covers or guards in the form of plates which extend over the cultivating-cylinder and are supported by oblique braces 33 and 34, which extend from the main frame of the machine upward and form supports for the driver's seat 21.

In order to provide for backing machine without operating the cylinder, the sprocket-wheel 29 is provided with a clutch-face 35, which engages a corresponding clutch-face 36 on the hub of the driving-wheel 3, the clutch-faces being held in engagement by means of a spring 37, extending around the axle 2. The teeth of the clutch-faces are so disposed that in the forward movement of the machine rotary motion is imparted to the sprocket-wheel 29 and thence transmitted to the cylinder. In the backward movement of the machine, however, the clutch-faces slip past each other. The teeth 10 are preferably arranged in spiral rows, which gives a better pulverizing action and also renders the machine lighter in draft.

I claim—

A cultivator embodying a main frame supported at one end by traction-wheels and at the other end by a steering-truck, a closed rotary cylinder or drum mounted in the frame between the front and rear supporting-wheels and provided with cutting-teeth, said frame embodying side bars extending from the front to the rear wheels and provided with vertical slots, boxes adjustable up and down in said slots and having the cylinder-shaft journaled therein, driving connections between the axle of the traction-wheels and the cylinder, means for adjusting the said boxes up and down, and a housing over said cylinder embodying a driver's seat-board, inclined braces extending forward and rearward therefrom and connected to the main frame, and inclined grooves supported by said braces.

In testimony whereof I affix my signature in presence of two witnesses.

WILLIAM H. THOMPSON.

Witnesses:
J. B. MONTGOMERY,
A. E. HULL.